UNITED STATES PATENT OFFICE.

JOSEPH J. SACHS, OF MANCHESTER, COUNTY OF LANCASTER, ENGLAND.

PRODUCTION OF MATERIALS FOR CASTINGS, CEMENTS, LEAD-PENCILS, &c.

SPECIFICATION forming part of Letters Patent No. 266,053, dated October 17, 1882.

Application filed November 1, 1880. (No specimens.) Patented in England September 8, 1880, No. 3,650; in France October 23, 1880; in Austria October 24, 1880; in Belgium October 25, 1880; in Germany October 25, 1880; in Italy December 21, 1880; in India April 9, 1881, and in Spain April 26, 1881.

*To all whom it may concern:*

Be it known that I, JOSEPH JULIUS SACHS, a subject of the Emperor of Austria, and residing at Manchester, county of Lancaster, England, have invented certain Improvements in the Production of Materials for Castings, Cements, Lead-Pencils, and other useful Purposes, (for which I have obtained a Patent in Great Britain, No. 3,650, dated 8th September, 1880,) of which the following is a specification.

My invention relates to the production of materials which I comprise under the name of "Vulcan cements," and which may be used as a substitute for metal cuttings, and may also be employed as cements, for packings, lead-pencils, and other useful purposes.

In carrying out my invention, in order to produce the so-called "Vulcan cements," I melt together sulphur or brimstone with other than metallic substances or metallic sulphides, in a state of a more or less fine powder—such, for example, as plumbago, charcoal, and other carbonized substances—every description of coal—as, for example, anthracite coal, common coal, brown coal, cannel-coal, and the like—silica and suitable silicates—as of potassium, sodium, calcium, barium, magnesium, chromium, aluminium, ferrum, mangan, lead, zinc, and the like—metallic hydrates and oxides—as those of calcium, magnesium, barium, aluminium, zinc, iron, lead, and the like—further, suitable metallic salts—as, for example, the insoluble salts of calcium, barium, magnesium, aluminium, iron, chrome, lead, and such like—and, lastly, inorganic substances in a powdered state—such, for example, as emery-powder, asbestus, slack-wool, yellow ochre, ultramarine, Prussian blues, and powders produced by grinding stones, minerals, earths, china, and other clays in their natural or burnt state, also powder from common clay, bricks, porcelain, china, and the like, pottery, cinders, ashes, slacks, quartz, and other sands. Of these substances I mix either one alone with sulphur, in excess or not in excess, or two or more of them, with or without the addition of a suitable organic fiber in a more or less short-cut state—as that of cotton, hemp, jute, and the like, in its rough or worked-up state—or wood, or other paper-pulps. These organic substances I also mix by themselves with melting sulphur.

In practice I have found a composition consisting of the following ingredients, in about the under-mentioned proportions, suitable. I take, say, four parts, by weight, of sulphur or brimstone and three, or more or less, parts, by weight, of finely-powdered coal or plumbago, or any of the substances mentioned above, or such others of the class as produce a similar product, the substances being either employed alone or two or more of them used in conjunction. I melt the whole together, at the same time stirring the mixture, so as to thoroughly incorporate the ingredients together.

These combinations can be used for castings. Those made with plumbago may also be used for the production of lead-pencils suitable for writing purposes, and the most of them are very suitable for cementing, packing, and similar purposes—such, for example, as for filling up printing-rollers or cartridges. The compositions made with emery-powder, or such like powders, can be used advantageously as grinding-stones for sharpening and other purposes. The composition may also be used for cast pipes for gas and other purposes, and for joining gas and water pipes, also for embedding railway-sleepers and for foundations, also for producing rollers for printing, embossing, and other purposes, also for type-printing, for lining cisterns, and, in particular, in all cases where the so-called "Spence's metal" is and can be used.

I may here further remark that these Vulcan cements, especially when the powders of the substances mixed with sulphur in suitable proportions have been very finely ground, produce castings of the greatest delicacy—such, for example, as casts of chrome-gelatine photographs, and any writing or painting or drawing produced by thick writing, drawing, copying, and photographing materials.

I prefer to allow the castings to cool in a vacuum or partial vacuum, as by this means a more perfect cast can be obtained.

Having now fully described my said invention and the manner of carrying the same into effect, I would observe, in conclusion, that I do not claim herein broadly the combination, with sulphur, of plumbago or non-metallic substances or mixtures containing the same, as I am aware that heretofore plumbago, steatite, or mixtures of plumbago and steatite, with or without metallic oxides or sulphides, as also soapstone-dust, plaster, and various other materials, have been mixed in the form of powder with melted sulphur; but in all such cases the plumbago or similar substance has been in proportions materially less than required by this specification.

What I do claim is—

The compositions described, comprising sulphur and plumbago or other non-metallic substances or mixtures containing the same in substantially the proportions specified—that is to say, four parts of the former to three of the latter, or thereabout—as set forth.

In testimony whereof I have signed my name to this specification in the presence of two subscribing witnesses.

JOSEPH JULIUS SACHS.

Witnesses:
CHAS. MILLS,
JOHN JAMES,
*Both of 47 Lincoln's Inn Fields, London.*